United States Patent
Yang et al.

(10) Patent No.: US 10,090,949 B2
(45) Date of Patent: Oct. 2, 2018

(54) TRANSMITTING APPARATUS AND RECEIVING APPARATUS, AND SIGNAL PROCESSING METHOD THEREOF

(71) Applicant: SAMSUNG ELECTRONICS CO., LTD., Suwon-si (KR)

(72) Inventors: Hyun-koo Yang, Seoul (KR); Young-ho Oh, Suwon-si (KR); Sung-hee Hwang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 152 days.

(21) Appl. No.: 14/314,487

(22) Filed: Jun. 25, 2014

(65) Prior Publication Data

US 2015/0022719 A1 Jan. 22, 2015

Related U.S. Application Data

(60) Provisional application No. 61/856,890, filed on Jul. 22, 2013.

(30) Foreign Application Priority Data

Jan. 9, 2014 (KR) .................. 10-2014-0002942

(51) Int. Cl.
  *H04H 20/28* (2008.01)
  *H04L 5/00* (2006.01)
(52) U.S. Cl.
  CPC ........... *H04H 20/28* (2013.01); *H04L 5/0053* (2013.01)
(58) Field of Classification Search
  CPC .............. H04H 20/28; H04L 5/0053
  (Continued)

(56) References Cited

U.S. PATENT DOCUMENTS 5,430,738 A * 7/1995 Tsuda ............... H04B 7/18523
                                                714/748
6,798,791 B1 * 9/2004 Riazi .................... H04H 40/90
                                                370/314

(Continued)

FOREIGN PATENT DOCUMENTS

KR   10-2010-01144441 A    10/2010
WO       2011142564 A2     11/2011

OTHER PUBLICATIONS

Written Opinion (PCT/ISA/237); dated Nov. 19, 2014; by the International Searching Authority in related application No. PCT/KR2014/006612.

(Continued)

*Primary Examiner* — Christine Ng
(74) *Attorney, Agent, or Firm* — Sughrue Mion, PLLC

(57) ABSTRACT

Provided are a transmitting apparatus, a receiving apparatus and methods of transmitting and receiving a data frame. The transmitting apparatus includes: a frame generator configured to cluster a predetermined number of frames to generate a frame cluster, at least one of the frames being generated by mapping data contained in an input stream to at least one signal processing path; an information inserter configured to insert signaling information into a signaling area of the at least one frame; and a transmitter configured to transmit the frame with the signaling information inserted therein, wherein the signaling information comprises profile information and duration information about the frame included in the frame cluster.

12 Claims, 18 Drawing Sheets

(58) Field of Classification Search
USPC ............... 370/328, 338, 470, 473, 474, 476
See application file for complete search history.

(56) References Cited

U.S. PATENT DOCUMENTS

| | | | |
|---|---|---|---|
| 7,545,833 B2* | 6/2009 | Chau .................. | G07C 9/00182 |
| | | | 340/12.5 |
| 2003/0121046 A1 | 6/2003 | Roy et al. | |
| 2004/0101046 A1* | 5/2004 | Yang ..................... | H03M 13/15 |
| | | | 375/240.08 |
| 2007/0159301 A1* | 7/2007 | Hirt ................... | H04W 52/0216 |
| | | | 340/10.1 |
| 2007/0173194 A1* | 7/2007 | Vare ....................... | H04H 20/26 |
| | | | 455/3.04 |
| 2009/0196217 A1* | 8/2009 | Himmanen ............. | H04L 12/56 |
| | | | 370/328 |
| 2010/0322229 A1* | 12/2010 | Kim ..................... | H04L 5/0092 |
| | | | 370/345 |
| 2011/0292858 A1 | 12/2011 | Jones et al. | |
| 2012/0300690 A1* | 11/2012 | Vare ..................... | H04L 1/0072 |
| | | | 370/312 |
| 2013/0308505 A1 | 11/2013 | Hong et al. | |
| 2015/0016453 A1* | 1/2015 | Kim .................. | H04L 12/1895 |
| | | | 370/390 |
| 2016/0088281 A1* | 3/2016 | Newton ................. | H04N 19/17 |
| | | | 348/43 |

OTHER PUBLICATIONS

International Search Report (PCT/ISA/210); dated Nov. 19, 2014; by the International Searching Authority in related application No. PCT/KR2014/006612.

* cited by examiner

FIG. 5A

| | |
|---|---|
| Frame_type | 4 bits |
| $N_{FC}$ | 8 bits |
| $N_F$ | 8 bits |
| for i=1 to $N_F$ { | |
|     $P(i)_F$ | 4 bits |
|     $T(i)_F$ | 22 bits |
| } | |
| $T_{FEF}$ | 25 bits |
| $I_{FC}$ | 8 bits |
| $IDX_F$ | 8 bits |
| $IDX_F$(Frame_type) | 8 bits |

510 braces the "for i=1 to $N_F$" block

FIG. 5B

|  |  |  |
|---|---|---|
| | Frame_type | 4 bits |
| | $N_{FC}$ | 8 bits |
| | $N_F$ | 8 bits |
| 521 | for i=1 to $N_F$ {<br>$\quad P_F(i)$<br>} | 4 bits |
| 522 | for i=0 to 2 {<br>$\quad T_F(i)$<br>} | 22 bits |
| | $T_{FEF}$ | 25 bits |
| | $I_{FC}$ | 8 bits |
| | $IDX_F$ | 8 bits |
| | $IDX_F$(Frame_type) | 8 bits |

FIG. 5C

| | |
|---|---|
| Frame_type | 4 bits |
| $N_{FC}$ | 8 bits |
| $N_F$ | 8 bits |
| 531 ~ $T_{NF,SP}(i)$ | 25 bits |
| 532 ~ $T_{NF,DP}(i)$ | 25 bits |
| 533 ~ $T_F$ | 22 bits |
| $T_{FEF}$ | 25 bits |
| $I_{FC}$ | 8 bits |
| $IDX_F$ | 8 bits |
| $IDX_F$(Frame_type) | 8 bits |

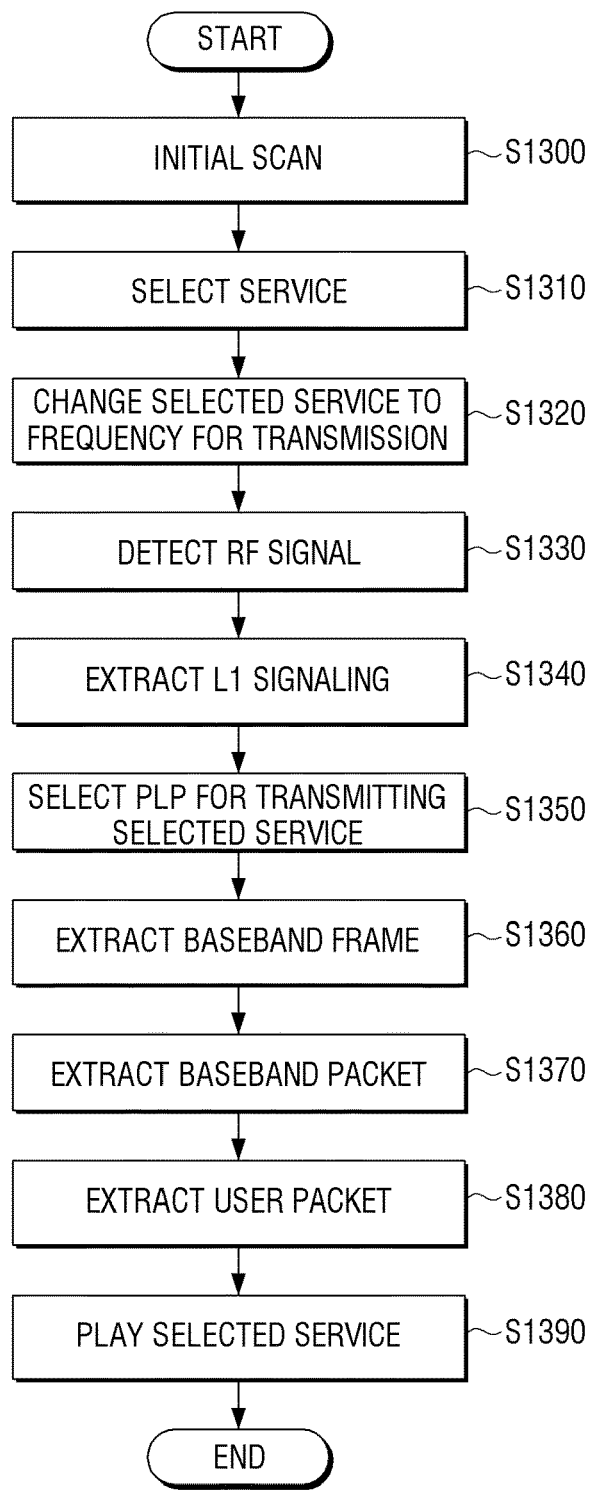

TRANSMITTING APPARATUS AND RECEIVING APPARATUS, AND SIGNAL PROCESSING METHOD THEREOF

CROSS-REFERENCE TO RELATED APPLICATIONS

This application claims priority from U.S. Provisional Patent Application No. 61/856,890, filed on Jul. 22, 2013, in the United States Patent and Trademark Office, and Korean Patent Application No. 10-2014-0002942, filed on Jan. 9, 2014, in the Korean Intellectual Property Office, the disclosures of which are incorporated herein by reference in their entirety.

BACKGROUND

1. Field

Apparatuses and methods consistent with the exemplary embodiments of the inventive concept relate to signal processing for mapping data to at least one signal processing signal and transmitting the data.

2. Description of the Related Art

In the 21 century information society, a broadcast communication service has reached the age of actual digitization, multi-channel, broadband, high quality. In particular, in recent days, as a high definition digital television (HDTV) and portable multimedia player (PMP), and a portable broadcast device have been extensively used, demands for support of various reception methods of a digital broadcast service have also increased.

With increase of these demands, standardization groups have established various standards and provided various services satisfying users' needs. Accordingly, there is a need for a method for providing better services using excellent performance if possible.

SUMMARY

Exemplary embodiments of the inventive concept overcome the above disadvantages and other disadvantages not described above. Also, the exemplary embodiments are not required to overcome the disadvantages described above, and may not overcome any of the problems described above.

One of more exemplary embodiments of the inventive concept provide a transmitting apparatus and a receiving apparatus, and a signal processing method thereof, by which a stream is configured so as to transmit various types of service data and signaling information corresponding to the stream is generated.

According to an aspect of an exemplary embodiment, there is provided a transmitting apparatus which may include: a frame generator configured to cluster a predetermined number of frames to generate a frame cluster, at least one of the frames being generated by mapping data contained in an input stream to at least one signal processing path; an information inserter configured to insert signaling information into a signaling area of the at least one frame; and a transmitter configured to transmit the frame with the signaling information inserted therein, wherein the signaling information comprises profile information and duration information about the frame included in the frame cluster.

A predetermined number of frame clusters, generated by the frame generator, and future extension frame (FEF) parts may constitute a super frame, and the signaling information may further include information about a number of the frame clusters in the super frame, duration information about each of the FEF parts, and index information about the frame.

The index information about the frame may include at least one of index information about a number of all frames constituting the super frame and index information about a number of frames having the same profile as the frame in the super frame.

The at least two frame may include at least two frames which includes at least two of a mobile type frame, a fixed type frame, and a multiple input multiple output (MIMO) type frame, respectively.

The signaling area of the frame may be an area for transmission of L1 signaling.

According to an aspect of another exemplary embodiment, there is provided a receiving apparatus which may include: a receiver configured to receive a stream comprising a frame cluster formed by clustering a predetermined number of frames at least one of which comprises signaling information and data mapped to at least one signal processing path; a signaling processor configured to extract the signaling information from the stream; and a signal processor configured to signal-process the frame cluster based on the signaling information, wherein the signaling information comprises profile information and duration information about the at least one frame included in the frame cluster.

The at least two frame may include at least two frames which includes signaling information which includes profile information and duration information about the two frames, respectively.

The at least two frames are at least two of a mobile type frame, a fixed type frame, and a multiple input multiple output (MIMO) type frame, respectively.

The signaling information may further include at least one of first information about a time difference between a first symbol of the frame and a first symbol of a frame having the same profile as the current frame among next frames of the frame, and second information about a time difference between the first symbol of the frame and a first symbol of a frame having a different profile from the frame among the next frames.

The signal processor may select and signal-process only a frame having the same profile as the frame using the first information and the duration information about the frame if the frame contains a required type of service data.

The signal processor may skip a frame having the same profile as the frame and perform signal processing using the second information and the duration information about the frame if the frame does not contain a required type of service data.

According to an aspect of still another exemplary embodiment, there is provided a signal processing method of a transmitting apparatus which may include: clustering a predetermined number of frames to generate a frame cluster, at least one of the frames being generated by mapping data contained in an input stream to at least one signal processing path; inserting signaling information into a signaling area of the at least one frame; and transmitting the frame with the signaling information inserted therein, wherein the signaling information comprises profile information and duration information about the frame included in the frame cluster.

A predetermined number of frame clusters, each of which is generated by the mapping, and FEF parts may constitute a super frame, and the signaling information may further include information about a number of the frame clusters in the super frame, duration information about each of the FEF parts, and index information about the frame.

The index information about the frame may include at least one of index information about a number of all frames constituting the super frame and index information about a number of frames having the same profile as the frame in the super frame.

The at least two frames may include at least two of a mobile type frame, a fixed type frame, and a MIMO type frame, respectively.

According to an aspect of still another exemplary embodiment, there is provided a signal processing method of a receiving apparatus which may include: receiving a stream comprising a frame cluster formed by clustering a predetermined number of frames at least one of which comprises signaling information and data mapped to at least one signal processing path; extracting the signaling information from the stream; and signal-processing the frame cluster based on the signaling information, wherein the signaling information comprises profile information and duration information about the at least one frame included in the frame cluster.

The at least one frame may include at least two frames which are of different types and the at least two frames may include signaling information including profile information and duration information about the two frames, respectively.

The signaling information may include at least one of first information about a time difference between a first symbol of the frame and a first symbol of a frame having the same profile as the frame among next frames of the frame, and second information about a time difference between the first symbol of the frame and a first symbol of a frame having a different profile from the frame among the next frames.

The signal-processing may include selecting and signal-processing only a frame having the same profile as the frame using the first information and the duration information about the frame if the frame contains a required type of service data, and skipping a frame having the same profile as the frame and performing signal processing using the second information and the duration information about the frame if the frame does not contain the required type of service data.

As described above, according to various exemplary embodiments, during transmission of various types of service data, a transmission band may be efficiently used and an area occupied by signaling information may be minimized, thereby enhancing a frame structure.

Additional and/or other aspects and advantages of the inventive concept will be set forth in part in the description which follows and, in part, will be obvious from the description, or may be learned by practice of the exemplary embodiments.

BRIEF DESCRIPTION OF THE DRAWING FIGURES

The above and/or other aspects of the inventive concept will be more apparent by describing certain exemplary embodiments with reference to the accompanying drawings, in which:

FIGS. 5A to 5C are diagrams illustrating various embodiments of L1 signaling;

FIG. 13 is a flow chart illustrating operations of a receiver according to an exemplary embodiment.

DETAILED DESCRIPTION OF THE EXEMPLARY EMBODIMENTS

Certain exemplary embodiments will now be described in greater detail with reference to the accompanying drawings. In the following description, a detailed description of known functions and configurations incorporated herein will be omitted when it may make the subject matter of the embodiments unclear. The terms used in the specification are defined in consideration of functions used in the embodiments, and can be changed according to the intent or conventionally used methods of clients, operators, and users. Accordingly, definitions of the terms should be understood on the basis of the entire description of the present specification.

Figure 1:
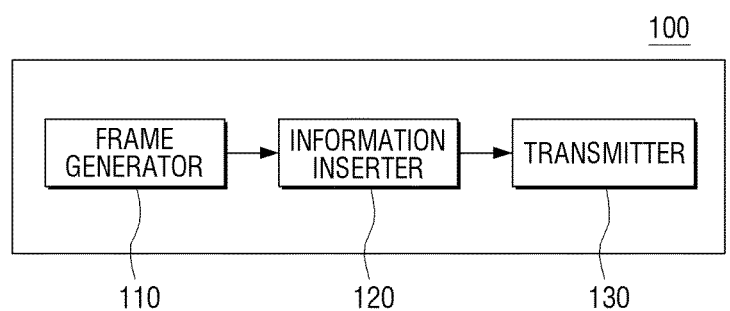
FIG. 1 is a block diagram illustrating a structure of a transmitting apparatus according to an embodiment.

FIG. 1 is a block diagram illustrating a structure of a transmitting apparatus 100 according to an exemplary embodiment. Referring to FIG. 1, the transmitting apparatus 100 includes a frame generator 110, an information inserter 120, and a transmitter 130.

A frame generator 110 maps data contained in an input stream to at least one signal processing path to generate a frame. According to an exemplary embodiment, the transmitting apparatus 100 may employ a Physical Layer Pipe (PLP) concept for providing various broadcast services using different modulation schemes, channel code rates, and time and cell interleaving lengths for one broadcast channel.

Here, a PLP refers to an independently processed signal path. That is, services (e.g., video, audio, other data, etc.) may be transmitted through a plurality of radio frequency (RF) channels. In this regard, a PLP is a path for transmitting such a service or a stream including service data transmitted through the path. In addition, the PLP may be positioned in slots that are distributed at a time interval on a plurality of RF channels or may be distributed at a time interval on one RF channel. That is, one PLP may be distributed and transmitted at a time interval on one RF channel or a plurality of RF channels.

A PLP configuration may include Input mode A for providing one PLP and Input mode B for providing a plurality of PLPs. When Input mode B is supported, the PLP may provide a robust service and may also distribute and transmit one stream to increase a time interleaving length, thereby achieving a time diversity gain. In addition, if only a specific stream is required to be received, a receiver may be powered on only during the time of receiving the specific stream, and thus, the PLP may be used at low power and is proper to provide portable and mobile broadcast services.

Here, the time diversity refers to a technology by which a transmitter side transmits the same signal at a predetermined time interval a plurality of times and then, a receiver side synthesizes the received signals to obtain excellent transmission quality in order to reduce degradation of transmission quality due to errors that may continuously occur on a mobile communication transmission path.

In addition, information that is commonly transmitted to a plurality of PLPs is contained and transmitted in one PLP to increase transmission efficiency. In this regard, this PLP is referred to as a common PLP. The other PLPs may be used to transmit service data. In this regard, these PLPs are referred to as data PLPs.

That is, the frame generator 110 maps service data contained in an input stream to at least one signal processing path to generate at least one frame and performs signal processing for each respective path. For example, the signal processing may include at least one process of input stream synchronization, delay compensation, null packet deletion, cyclic redundancy check (CRC) encoding, header insertion, coding, interleaving, and modulation. At least one frame that is signal-processed for at least one signal processing path is generated together with signaling information as one transmission frame and the generated transmission frame is transmitted to a receiving apparatus (not shown).

The frame generator 110 may cluster a predetermined number of frames. Hereinafter, a cluster of the predetermined number of frames is referred to as a frame cluster.

In this case, a predetermined number of frame clusters and at least one future extension frame (FEF) part may configure a super frame. Here, the super frame and the FEF part are also defined in the Digital Video Broadcasting-Second Generation Terrestrial (DVB-T2) which is one of European digital broadcast standards, and thus, a detailed description thereof will be omitted.

As described above, a super frame may include a predetermined number $N_{FC}$ of frame clusters and may further include at least one FEF part, and each frame cluster may include a predetermined number $N_F$ of frames. In this case, respective frames contained in the frame clusters may be different types of service data. That is, the respective frames may have different profiles. Here, a profile may indicate a data type contained in a frame, that is, whether the data type is at least one of a base (or fixed) type, a mobile type, a multiple input multiple output (MIMO) type, and a multiple input single output (MISO) type, not being limited thereto.

In addition, all frame clusters in a super frame may have the same configuration. For example, a plurality of frame clusters constituting one super frame may have the same profile sequence and frame duration sequence. That is, the frame clusters may have the same duration. Here, a frame profile sequence (hereinafter, referred to as a profile sequence) refers to sequentially listed profiles of frames constituting a frame cluster and may be configured in the form of $SP_F = \{P_F(0), P_F(1), \ldots, P_F(N_F-1)\}$. In addition, a frame duration sequence (hereinafter, referred to as a duration sequence) refers to sequentially listed frames constituting a frame cluster may be configured in the form of $ST_F = \{T_F(0), T_F(1), \ldots, T_F(N_F-1)\}$. In this case, a frame cluster duration $T_{FC} = T_F(0) + T_F(1) + \ldots + T_F(N_F-1)$ may be calculated. In addition, a super frame duration $T_{FC} = N_{FC} \times T_{FC} + (N_{FC}/I_{FC}) \times T_{FEF}$ may be calculated. Here, $I_{FC}$ refers to the number of frame clusters present between two FEF parts.

The expression that a plurality of frame clusters constituting one super frame has the same profile and duration sequence indicates that, when a first frame cluster has a profile sequence of $SP_F = \{A, B, B, A, B, B, \ldots, A, B, B\}$, the remaining frame clusters also have the same profile sequence. That is, the expression indicates that, when the first frame cluster has a configuration in which A type of frame, B type of frame, and B type of frame are repeatedly arranged, the remaining frame clusters also have the same configuration.

Frames having the same profile may have the same duration in a super frame. Thus, when a plurality of frame clusters constituting one super frame has the same profile sequence, the frame clusters may have the same duration sequence.

The number $I_{FC}$ of frame clusters present between two FEF parts may be a divisor of the number $N_{FC}$ of frame clusters constituting a super frame and may be configured to have the same number in all super frames, but is not limited thereto.

The information inserter 120 inserts signaling information into a signaling area of a frame.

Here, the signaling information may be a signaling signal of Layer 1 (L1) for transmitting an L1 signal for a series of processes required to extract service data from an RF signal. These processes may include a frame synchronization acquisition process, and the signaling signal may include a configurable field and a dynamic field. In addition, the signaling area may include a P2 symbol for frame synchronization. The signaling area may be added to a start portion of a frame to generate a transmission signal. According to an exemplary embodiment, in a DVB-T2 system, one unit of a transmission frame obtained by adding a P1 symbol and a signaling area to a frame is referred to as a T2 frame.

The P2 symbol may be classified into a pre signaling information area and a post signaling information area. In addition, the post signaling information area may include a configurable field and a dynamic field.

P1 and P2 symbols are terms used in the DVB-T2, the P1 symbol may be interpreted as a symbol indicating a start of a frame, and the P2 symbol may be interpreted as a symbol including a signaling area. According to another example, the start of a frame may be indicated using one preamble symbol including a signaling area.

According to an exemplary embodiment, signaling information inserted into a signaling area may include profile information and duration information about different types of frames contained in a frame cluster.

For example, respective pieces of profile information and respective pieces of duration information about different types of frames contained in a frame cluster may be included in the respective frames.

According to another exemplary embodiment, respective pieces of profile information about different types of frames contained in a frame cluster may be included in the respective frames, and respective pieces of duration information may be included for respective profiles.

Signaling information may include frame cluster number information and FEF part duration information in a super frame.

The signaling information may include profile information about a current frame and index information about the current frame.

Here, the index information about the current frame may include at least one of index information about the number of all frames constituting a super frame and index information about the number of frames having the same profile in the super frame.

Information (or a parameter) that is not changed and is maintained for entire duration of one super frame may be inserted into a configurable field and specific information about the current frame may be inserted into a dynamic field.

In detail, frame cluster number information $N_{FC}$ in a super frame, frame number information $N_F$ constituting a frame cluster, profile information about a frame, frame duration information, duration information $T_{FEF}$ about an FEF part, number information $I_{FC}$ about frames present between two FEF parts, etc. may be inserted into the configurable field.

For example, the frame cluster number information $N_{FC}$ about a super frame may be inserted using eight (8) bits (2 to 255), the frame number information $N_F$ constituting a frame cluster may be inserted using 7 bits (1 to 128), a frame profile sequence $SP_F$ may be inserted using $4 \times N_F$ bits (assuming that the number of profiles is smaller than 16), a frame duration sequence may be inserted using $22 \times N_F$ bits (assuming that the same orthogonal frequency division multiplexing (OFDM) parameter as DVB-T2 is used), FEF part duration $T_{FEF}$ may be inserted using 25 bits (assuming that the same OFDM parameter as DVB-T2 is used), the number information $I_{FC}$ about frames present between two FEF parts may be inserted using eight (8) bits (0 to 255). However, the embodiments are not limited thereto.

In addition, the profile information about the current frame, the index information about the current frame, duration information about the current frame, etc. may be inserted into the dynamic field.

For example, profile information Frame_type about the current frame may be inserted using four (4) bits, index $IDX_F$ of the current frame with respect to all frames constituting a super frame may be inserted using eight (8) bits (0 to 255), and index $IDX_F(i)$ of the current frame with respect to frames having the same profile among all frames constituting the super frame may be inserted using eight (8) bits (0 to 255). However, the embodiments are not limited thereto.

The transmitter 130 transmits a frame into which signaling information is inserted. The transmitting apparatus 100 may transmit service data together with the aforementioned type of signaling information containing position and size information about data to a receiving apparatus (not shown).

In detail, the transmitter 130 may transmit data through each cell of an OFDM symbol. Some OFDM symbols may perform various functions such as transmission of an L1 signaling field, signal detection, frame opening and closing, etc., which is not related to the embodiments, and thus is not described in detail here.

Figure 2:
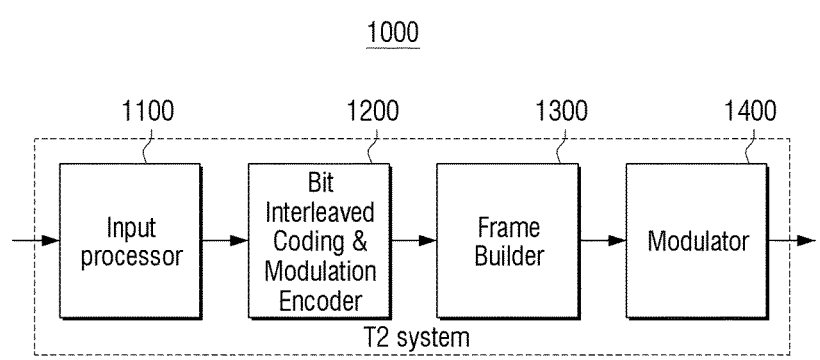
FIG. 2 is a block diagram for explanation of a structure of a Digital Video Broadcasting-Second Generation Terrestrial (DVB-T2) transmission system of a transmitting side.

FIG. 2 is a block diagram for explanation of a structure of a DVB-T2 transmission system 1000 which is a base of exemplary embodiments of the inventive concept.

Referring to FIG. 2, the DVB-T2 transmission system 1000 may include an input processor 1100, a bit interleaved coding and modulation (BICM) encoder 1200, a frame builder 1300, and a modulator 1400.

The DVB-T2 transmission system 1000 is explained in the DVB-T2, and thus will be described briefly. For a detailed description thereof, refer to the "Digital Video Broadcasting (DVB); Frame structure channel coding and modulation for a second generation digital terrestrial television broadcasting system (DVB-T2)".

The input processor 1100 generates a baseband frame (BBFRAME) from an input stream of service data. Here, the input stream may be an MPEG-2 transport stream (TS), a generic stream (GS), etc.

The BICM encoder 1200 performs encoding using a forward error correction (FEC) code, an interleaving method, and signal constellations, which are determined according to transmission rate, transmission quality, transmitted area (a fixed PHY frame or a mobile PHY frame), and a network configuration state, which are required for serving the service data. In some exemplary embodiments, signaling information about the service data may be encoded via a separate BICM encoder (not shown) or may share the BICM encoder 1200 with the service data and may be encoded.

The frame builder 1300 and the modulator 1400 determines an OFDM parameter for a signaling area and an OFDM parameter about an area to which the service data is to be transmitted to constitute a frame and adds a sink area to generate a frame. In addition, modulation is performed to module the generated frame into an RF signal, and the RF signal is transmitted to a receiver.

The frame generation and information insertion described with reference to FIG. 1 may be performed by the frame builder 1300.

Figure 3:
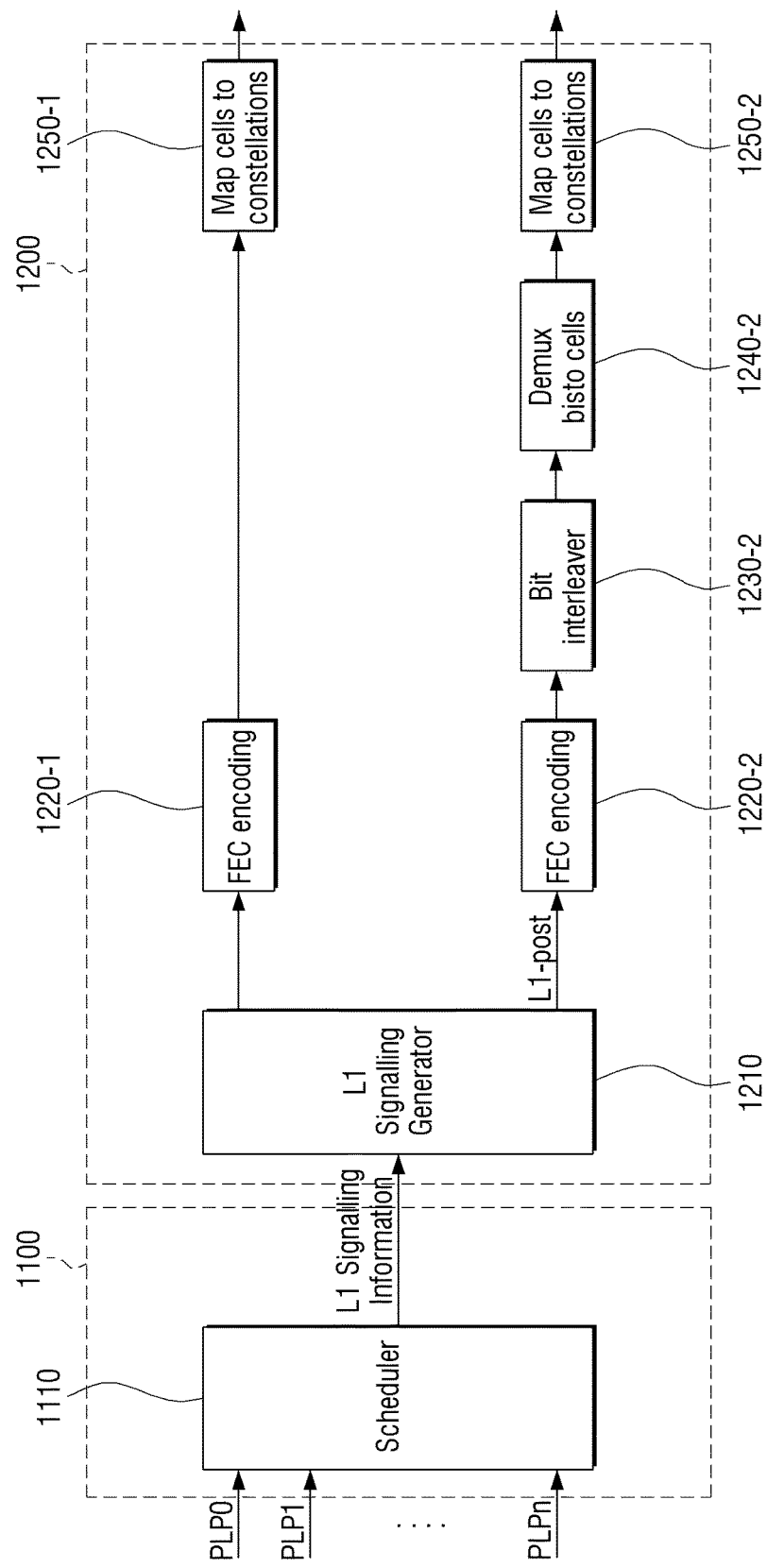
FIG. 3 is a block diagram for explanation of a configuration of generation of signaling information according to an embodiment.

FIG. 3 is a block diagram for explanation of a configuration of generation of signaling information according to an exemplary embodiment.

FIG. 3 illustrates the input processor 1100 and the BICM encoder 1200. The input processor 1100 may include a scheduler 1110. The BICM encoder 1200 may include an L1 signaling generator 1210, FEC encoders 1220-1 and 1220-2, a bit interleaver 1230-2, a demux 1240-2, and constellation mappers 1250-1 and 1250-2. The BICM encoder 1200 may further include a time interleaver (not shown). In addition, the L1 signaling generator 1210 may be included in the input processor 1100.

n service data are mapped to PLP0 to PLPn. The scheduler 1110 determines a position, and modulation and code rates for respective PLPs in order to map the PLPs to a physical layer of T2. That is, the scheduler 1110 generates L1 signaling information. As necessary, the scheduler 1110 may output dynamic field information of L1-post signaling information about a current frame to the frame builder 1300. In addition, the scheduler 1110 may transmit the L1 signaling information to the BICM encoder 1200. The L1 signaling information includes L1-pre signaling information and L1-post signaling information.

The L1 signaling generator 1210 differentiates and outputs the L1-pre signaling information and the L1-post signaling information. The FEC encoders 1220-1 and 1220-2 perform FEC encoding including shortening and puncturing on the L1-pre signaling information and the L1-post signaling information, respectively. The bit interleaver 1230-2 performs interleaving in bit units on the encoded L1-post signaling information. The demux 1240-2 adjusts an order of bits constituting a cell to control the robustness of the bits and outputs the cell including the bits. The two constellation mappers 1250-1 and 1250-2 map cells of the L1-pre signaling information and L1-post signaling information to constellation. The L1-pre signaling information and the L1-post signaling information that are processed through the aforementioned process are output to the frame builder 1300. Thus, the L1-pre signaling information and the L1-post signaling information may be inserted into a frame.

FIGS. 4A to 4D are diagrams for explanation of a structure of a unit of a transmission frame according to an exemplary embodiment.

Figure 4A:
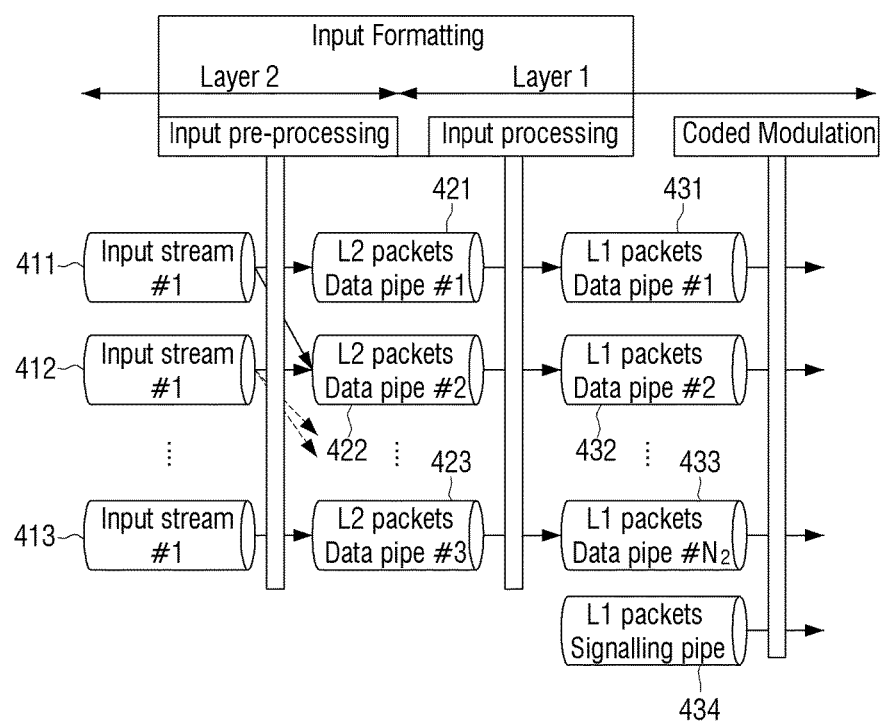
FIGS. 4A to 4D are diagrams for explanation of a structure of a unit of a transmission frame according to an embodiment.

As illustrated in FIG. 4A, an input processing module processed in an L1 packet may operate at a data pipe level.

FIG. 4A illustrates a process of processing the input stream in the L1 packet. A plurality of input streams 411 to 413 are processed as a plurality of L2 packet data pipes 421 to 423 via an input pre-processing process, and the plurality of L2 packet data pipes 421 to 423 are encapsulated in a plurality of L1 packet data pipes 431 to 433 via an input processing process and are scheduled for a transmission frame (1110 of FIG. 3). Here, a L2 packet may have two types of streams including a fixed stream such as a transport stream (TS) stream and a variable stream such as a general stream encapsulation (GSE) stream.

Figure 4B:
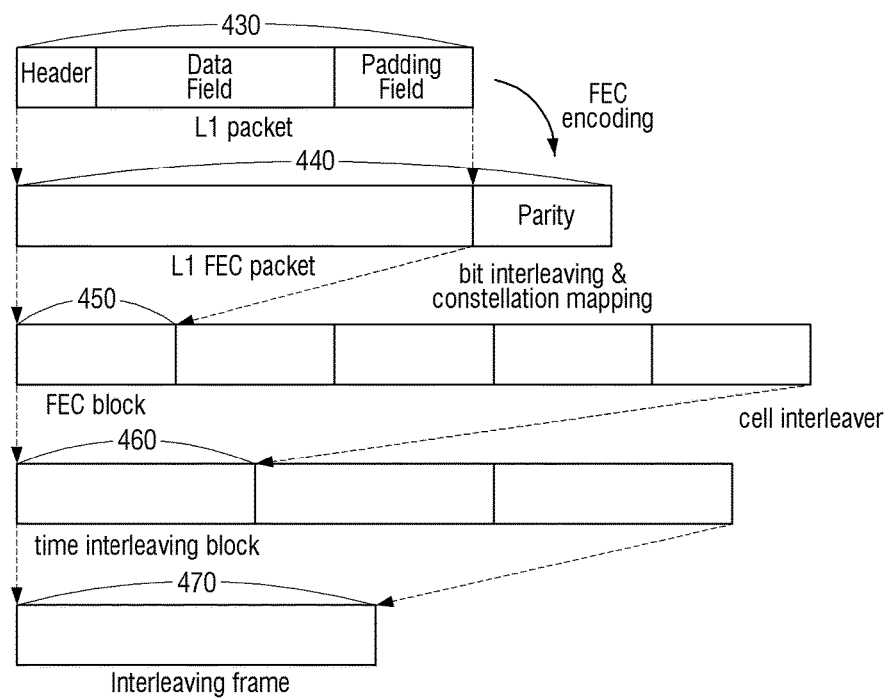

FIG. 4B is a diagram for explanation of a structure of a local frame of each PLP.

As illustrated in FIG. 4B, an L1 packet 430 includes a header, a data field, and a padding field.

The L1 packet 430 is processed as an L1 FEC packet 440 by adding parity 432 via an FEC encoding process.

The L1 FEC packet 440 is processed as an FEC block 450 via bit interleaving and constellation mapping processes, a plurality of FEC blocks are processed as a time interleaving block 460, and a plurality of time interleaving blocks constitutes an interleaving frame 470. In this case, cell interleaving may be applied to a process of configuring the time interleaving block 460.

Figure 4C:
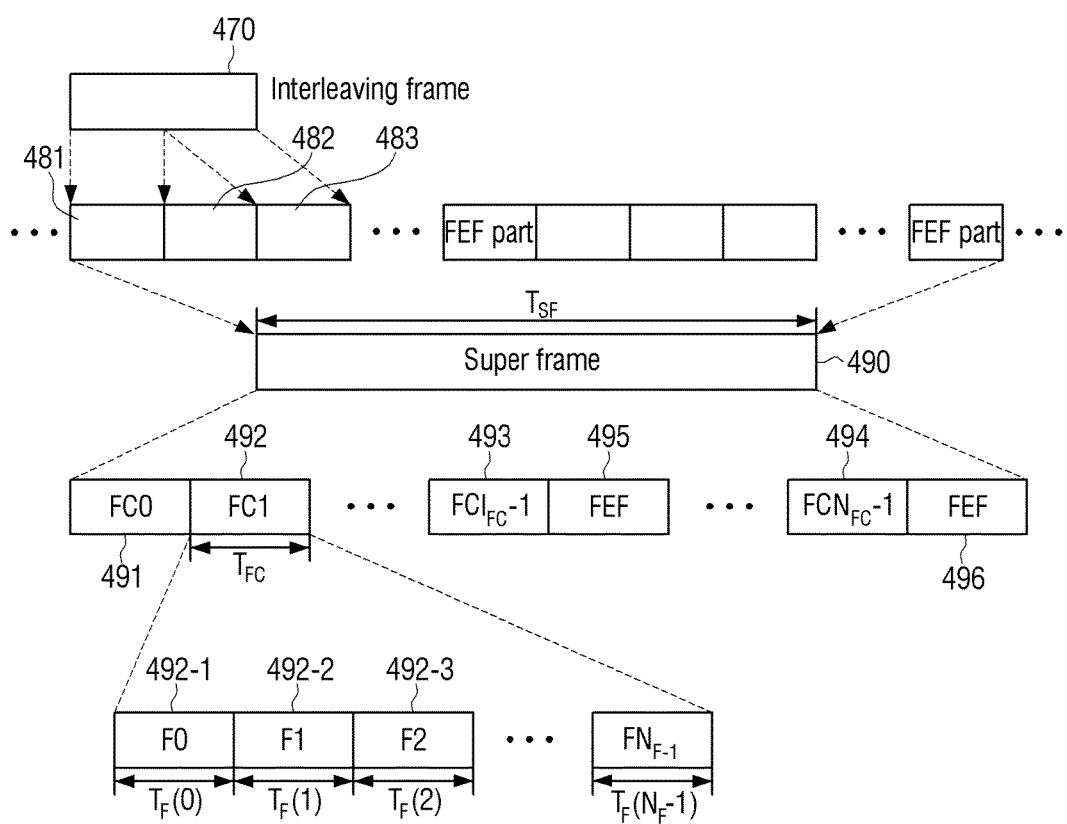

FIG. 4C is a diagram for explanation of a structure of an interleaving frame 470.

Referring to FIG. 4C, the interleaving frame 470 may be transmitted through different transmission frames 481, 482, and 483. In addition, a plurality of transmission frames and FEF parts may form one super frame 490.

However, according to an exemplary embodiment, a plurality of transmission frames constituting one super frame may be grouped to a predetermined number (e.g., $N_F$) to form a frame cluster. That is, a plurality of frame clusters 491, 492, 493, and 494, and FEF parts 495 and 496 may constitute a super frame.

Each cluster frame constituting a super frame may include a predetermined number $N_F$ of frames 492-1, 492-2, 492-3 . . . .

Although FIGS. 4B and 4C illustrate a structure having a well-defined boundary between a type interleaving block and an interleaving frame assuming a block type of time interleaver, when consecutive time interleavers are used, a boundary therebetween may not be well defined. For example, an example of consecutive time interleaver may include a convolution interleaver.

Figure 4D:
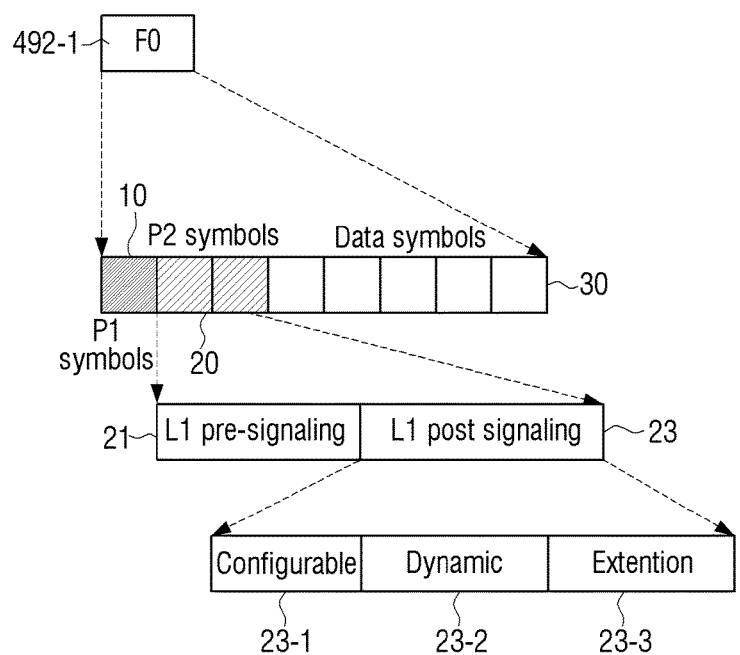

FIG. 4D is a diagram for explanation of a structure of a transmission frame.

As illustrated in FIG. 4D, one transmission frame 492-1 may include a P1 symbol 10 indicating a start point of the transmission frame 492-1, P2 symbols 20 for transmission of an L1 signal, and data symbols 30 for transmission of service data. Here, the transmission frame 492-1 may be referred to as a T2 frame The P1 symbol 10 may be positioned at a start portion of the transmission frame 492-1 and may be used to detect a start point of the transmission frame 492-1 and to transmit a small amount of information. For example, the P1 symbol 10 may transmit seven (7) bits of information.

The P2 symbols 20 are positioned next to the P1 symbol 10 of the transmission frame 492-1. The P2 symbols 20 include L1-pre signaling information 21 and L1-post signaling information 23. The L1-pre signaling information 21 provides basic transmission parameters including parameters required to receive and decode L1-post signaling.

The L1-post signaling information 23 includes a configurable field 23-1 and a dynamic field 23-2. In addition, the L1-post signaling information 23 may optionally include an extension field 23-3. Although not illustrated, the L1-post signaling information 23 may further include a CRC field, and may optionally and further include an L1 padding field.

According to an exemplary embodiment, information (or a parameter) that is not changed and is maintained with respect to an entire duration TSF of one super frame may be inserted into a configurable field and specific information in a current frame may be inserted into a dynamic field.

In detail, frame cluster number information $N_{FC}$ about a super frame, frame number information $N_F$ constituting a frame cluster, profile information about a frame, frame duration information $T_F$, duration information $T_{FEF}$ about an FEF part, number information $I_{FC}$ about frames present between two FEF parts, etc. may be inserted into the configurable field.

In addition, profile information about the current frame, index information about the current frame, etc. may be inserted into a dynamic field.

According to an exemplary embodiment, a preamble including L1 signaling information and information for simultaneously performing functions of P1 and P2 symbols, that is, for simultaneously performing channel adaptation and detection of a start point of a transmission frame may be generated and disposed, and then, a data symbol may be disposed to constitute a transmission frame.

FIGS. 5A to 5C are diagrams illustrating various exemplary embodiments of L1 signaling.

In FIGS. 5A to 5C, for convenience of description, it is assumed that three profiles, that is, three types of data are transmitted. In this case, two (2) bits are used to indicate a profile type. For example, 00 may indicate profile A (e.g., a base profile), 01 may indicate profile B (e.g., a mobile profile), 10 may indicate profile C (e.g., a MIMO profile), and 11 may indicate a reserve area.

According to an exemplary embodiment illustrated in FIG. 5A, L1 signaling may include all pieces of information required for signal processing, that is, all pieces of information about frames constituting a frame cluster.

That is, as illustrated in FIG. 5A, the L1 signaling may include a frame type, the number $N_{FC}$ of frame clusters, frame number $N_F$ constituting a frame cluster, profile $P_F(i)$ and duration $T_F(i)$ about each frame, duration $T_{FEF}$ of FEF part, number $I_{FC}$ of frame clusters present between FEF parts, index $IDX_F$ of the current frame with respect to all frames, and index $IDX_F$ of the current frame with respect to frames having the same type.

As illustrated in FIG. 5A, the L1 signaling may include profile and duration information about each frame. For example, the L1 signaling may include sequentially listed profile and duration information about a first frame F1, and include sequentially listed profile and duration information about a second frame F2.

FIG. 5B illustrates a modified example of the structure of FIG. 5A. According to an exemplary embodiment of FIG. 5B, L1 signaling may also include all pieces of information required for signal processing.

Referring to FIG. 5B, the L1 signaling may include profile information about each frame and include duration information corresponding to each profile type, unlike in FIG. 5A. For example, the L1 signaling may include profile information of each frame and duration information for each respective profile, but not for each respective frame.

According to another exemplary embodiment illustrated in FIG. 5C, L1 signaling may include only partial information about frames constituting a frame cluster.

That is, as illustrated in FIG. 5C, the L1 signaling may include duration $T_F$ of a current frame, information $T_{NF,SP}$ and $T_{NF,DP}$ about a time difference between a first symbol of a current frame and a first symbol of a first frame having the same profile as the current frame among next frames, and information $T_{NF,DP}$ about a time difference between the first symbol of the current frame and a first symbol of a first symbol having a different profile from the current frame among next frames.

Figure 6:
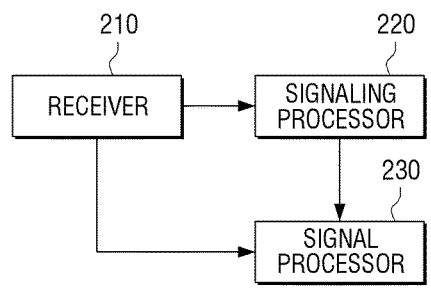
FIG. 6 is a block diagram illustrating a structure of a receiving apparatus according to an embodiment.

FIG. 6 is a block diagram illustrating a structure of a receiving apparatus 200 according to an exemplary embodiment.

Referring to FIG. 6, the receiving apparatus 200 includes a receiver 210, a signaling processor 220, and a signal processor 230.

The receiver 210 receives a radio frequency (RF) signal including a frame cluster formed by clustering a predetermined number of frame units including signaling information and data mapped to at least one signal processing path. Here, the signaling information may include profile information about different types of frames included in the frame cluster and duration information about a frame.

In detail, the signaling information may include profile information and duration information about each of the different types of frames included in the frame cluster, for each respective frame.

Alternatively, the signaling information may include profile information about each of the different types of frames included in the frame cluster for each respective frame, and may include duration information for each respective profile.

In addition, the signaling information may include at least one of first information about a time difference between a first symbol of a current frame and a first symbol of a frame having the same profile as the current frame among next frames of the current frame and second information about a time difference between the first symbol of the current frame and a first symbol of a frame having a different profile from the current frame among next frames.

According to an exemplary embodiment, when a sink area and a signaling area are differentiated, the receiver 210 performs demodulation according to an OFDM parameter from an received RF signal to perform sink detection, and when sink is detected, the receiver 210 recognizes whether a frame that is currently received from signaling information stored in the sink area is a frame including required service data. For example, the receiver 210 may recognize whether a mobile frame or a fixed frame is received.

In this case, when an OFDM parameter about a signaling area and a data area is not predetermined, the OFDM parameter about the signaling area and data area stored in the sink area may be acquired and OFDM parameter information about a signaling area and data area just next to the sink area may be acquired to perform demodulation.

According to another embodiment, when the sink area and the signaling area are not differentiated, the receiver 210 performs demodulation according to an OFDM parameter from a received RF signal to perform sink detection and transmits the demodulated OFDM cells to the signaling processor 220. The signaling processor 220 processes the demodulated OFDM cells to recognize whether a currently received frame is a frame including required service data. For example, the signaling processor 220 may recognize whether a mobile frame or a fixed frame is received.

The signaling processor 220 extracts signaling information from the received frame. In particular, the signaling processor 220 may extract the L1 signaling and interpret the extracted L1 signaling to acquire profile information and duration about a frame included in a frame cluster. To this end, the signaling processor 220 may detect P1 and P2 symbols to perform demodulation, and then extract a data block including the L1 signaling to perform decoding. According to another exemplary embodiment, the signaling processor 220 may detect a preamble symbol to perform demodulation, and then extract a data block including the L1 signaling to perform decoding.

The signal processor 230 may signal-process a frame cluster based on the extracted signaling information. For example, the signal processing may include demodulation, frame de-builder, BICM decoding, and input de-processing.

In detail, when required service data, that is, service data selected by a user of the receiving apparatus 200 is present in a current frame based on the profile information and duration information about a frame, included in the signaling information, the signal processor 230 may perform decoding on all frames or specific PLPs, and when the required service data is not present in the current frame, the signal processor 230 may move to a next frame to process a stream.

For example, a description will be given assuming that the signaling information includes duration information about a current frame, first information about a time difference between a first symbol of a current frame and a first symbol of a frame having the same profile as the current frame among next frames, and second information about a time difference between the first symbol of the current frame and a first symbol of a frame having a different profile from the current frame among the next frames.

In this case, when a required type of service data is included in the current frame, the signal processor 230 may select and signal-process only a frame having the same profile as the current frame using duration information about the current frame and the first information.

In addition, when the required type of service data is not included in the current frame, the signal processor 230 may skip a frame having the same profile as the current frame and perform signal processing using the duration information about the current frame and the second information. Here, the aforementioned process may be repeated until a frame including the required type of service data is detected. Then, when the required type of service data is present in the current frame, the signal processor 230 may select and signal-process only a frame having the same profile as the current frame using the duration information about the current frame and the first information.

Figure 7:
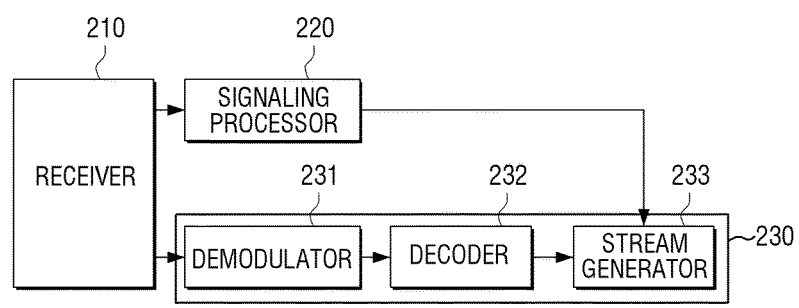
FIG. 7 is a block diagram for detailed explanation of a signal processor according to an embodiment.

FIG. 7 is a block diagram for detailed explanation of the signal processor 230 according to an exemplary embodiment.

Referring to FIG. 7, the signal processor 230 includes a demodulator 231, a decoder 232, and a stream generator 233.

The demodulator 231 demodulates a received signal to generate a value corresponding to each low density parity check (LDPC) codeword and outputs the value to the decoder 232. In this case, the demodulator 231 may acquire a parameter of a modulation scheme, etc. of data stored in each data area using the signaling information and perform demodulation. In addition, the demodulator 231 may calculate a position of required data based on data information included in a configurable field and a dynamic field. That is, a position of frame for transmission of required PLP may be calculated.

The decoder 232 performs decoding on required data. In this case, the decoder 232 may acquire a parameter of an FEC scheme of data stored in each data area using the signaling information and perform decoding.

The stream generator 233 may process a BB frame BBFRAME input from the decoder 232 to generate service data.

For example, the stream generator 233 may generate an L2 packet from an error-corrected L1 packet based on an input frame synchronizer (ISSY) mode, buffer size (BUFS), time to output (TTO) value, and input stream clock reference (ISCR), which are provided by the signaling processor 220.

In detail, the stream generator 233 may include de-jitter buffers which may re-generate accurate timing for restoration of an output stream based on the ISSY mode, BUFS, TTO value, and ISCR, which are provided by the signaling processor 220. Accordingly, delay for sink between a plurality of PLPs may be compensated for.

Figure 8:
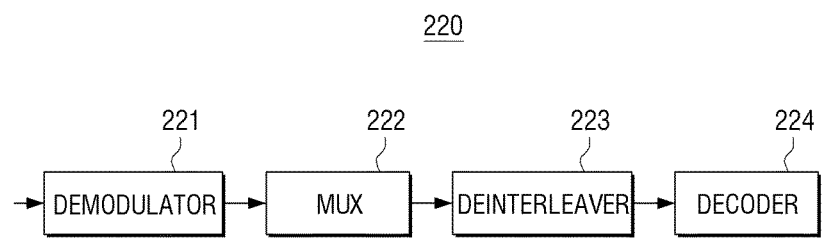
FIG. 8 is a block diagram illustrating of a signaling processor according to an embodiment.

FIG. 8 is a block diagram illustrating of the signaling processor 220 according to an exemplary embodiment.

Referring to FIG. 8, the signaling processor 220 includes a demodulator 221, a mux 222, a deinterleaver 223, and a decoder 224.

The demodulator 221 receives a signal transmitted from the transmitting apparatus 100 and demodulates the signal. In detail, the demodulator 221 demodulates a received signal to generate a value corresponding to an LDPC codeword and outputs the value to the mux 222.

In this case, the value corresponding to the LDPC codeword may be expressed as a channel value of the received value. Here, the channel value may be determined using various methods. For example, the channel value may be determined by determining a log likelihood ratio (LLR) value.

Here, the LLR value may be expressed by applying Log to a ratio of the possibility that a bit transmitted from the transmitting apparatus 100 is 0 and the possibility that the bit is 1. The LLR value may be a bit value determined according to a hard decision or may be a representative value determined according to a section to which the possibility that a bit transmitted from the transmitting apparatus 100 is 0 or 1 belongs.

The mux 222 multiplexes an output value of the demodulator 221 and outputs the output value to the deinterleaver 223. Here, the output value of the demodulator 221 may be a value corresponding to the LDPC codeword and for example, may be an LLR value.

In detail, the mux 222 may be a component corresponding to the demux 1240-2 (refer to FIG. 3) included in the transmitting apparatus 100 and may inversely perform the de-multiplexing performed by the demux 1240-2. That is, the mux 222 parallel-to-serial converts the value corresponding to the LDPC codeword output from the demodulator 221 to multiplex the value corresponding to the LDPC codeword.

The deinterleaver 223 deinterleaves the output value of the mux 222 and outputs the output value to the decoder 224.

In detail, the deinterleaver 223 is a component corresponding to the bit interleaver 1230-2 (refer to FIG. 3) included in the transmitting apparatus 100 and may inversely perform the operation performed by the bit interleaver 1230-2 (refer to FIG. 3). That is, the deinterleaver 223 may deinterleave the value corresponding to the LDPC codeword so as to correspond to the interleaving operation performed by the bit interleaver 1230-2 (refer to FIG. 3). Here, an example of the value corresponding to the LDPC codeword may be an LLR value.

The decoder 224 may be a component corresponding to the FEC encoder 1220-2 included in the transmitting apparatus 100 and may inversely perform the operation performed by the FEC encoder 1220-2. In detail, the decoder 224 may perform decoding based on the deinterleaved LLR value to output the signaling information, that is, L1 signaling.

Figure 9:
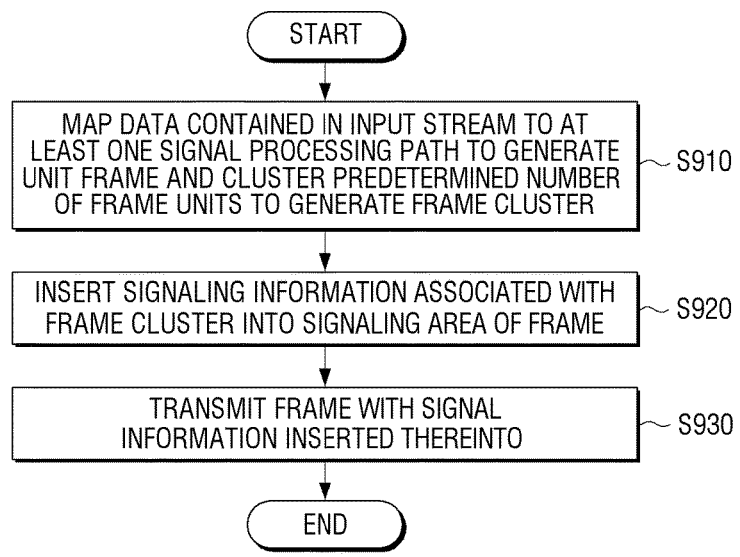
FIG. 9 is a flowchart for explanation of a signal processing method of a transmitting apparatus according to an embodiment.

FIG. 9 is a flowchart for explanation of a signal processing method of a transmitting apparatus according to an exemplary embodiment.

In the signal processing method of the transmitting apparatus illustrated in FIG. 9, first, data contained in an input stream is mapped to at least one signal processing path to generate a frame and a predetermined number of frames are clustered to generate a frame cluster (S910).

Then, signaling information is inserted into a signaling area of the frame (S920).

Then, the frame into which the signaling information is inserted is transmitted as a transmission frame (S930).

Here, the signaling information may include profile information and duration information about different types of frames included in the frame cluster.

In addition, a predetermined number of frame clusters and FEF parts may constitute a super frame. The signaling information may further include number information about frame clusters in a super frame, duration information about an FEF part, profile information about a current frame, and index information about the current frame.

In this case, the index information about the current frame may include at least one of index information about the number of all frames constituting a super frame and index information about the number of frames having the same profile in the super frame.

Figure 10:
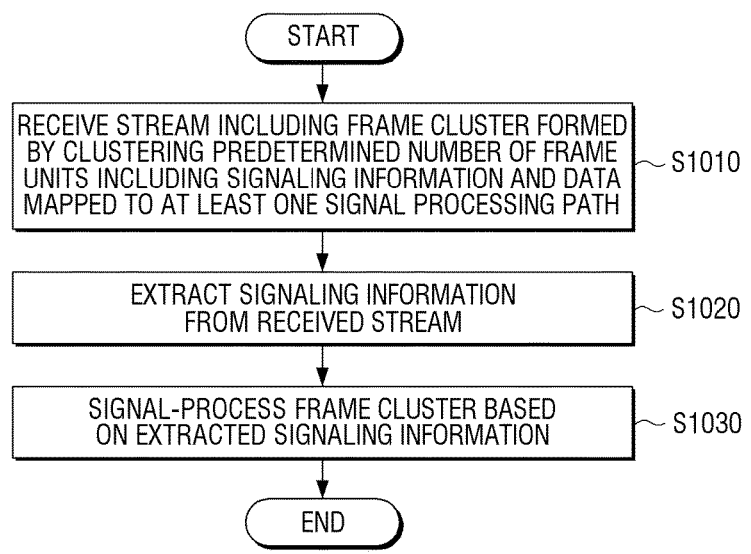
FIG. 10 is a flowchart for explanation of a signal processing method of a receiving apparatus according to an embodiment.

FIG. 10 is a flowchart for explanation of a signal processing method of a receiving apparatus according to an exemplary embodiment.

In the signal processing method of the receiving apparatus illustrated in FIG. 10, a stream including a frame cluster formed by clustering a predetermined number of frame units including signaling information and data mapped to at least one signal processing path (S1010).

Then, the signaling information is extracted from the received stream (S1020).

Then, the frame cluster is signal-processed based on the extracted signaling information (S1030).

Here, in operation S1030, the frame cluster may be processed based on the signaling information including profile information about different types of frames included in the frame cluster and duration information about the frames.

In this case, the signaling information may include profile information and duration information about each of the different types of frames included in the frame cluster, for each respective frame, or may include profile information about each of the different types of frames included in the frame cluster, and may include duration information for each respective profile.

In addition, the signaling information may include at least one of first information about a time difference between a first symbol of a current frame and a first symbol of a frame having the same profile as the current frame among next frames, and second information about a time difference between the first symbol of the current frame and a first symbol of a frame having a different profile from the current frame among next frames.

In this case, in operation S1030, when a required type of service data is present in the current frame, only a frame having the same profile as the current frame may be selected and signal-processed using the duration information about the current frame and the first information, and when the required type of service data is not present in the current frame, a frame having the same profile as the current frame may be skipped and signal-processing may be performed using the duration information about the current frame and the second information.

Figure 11:
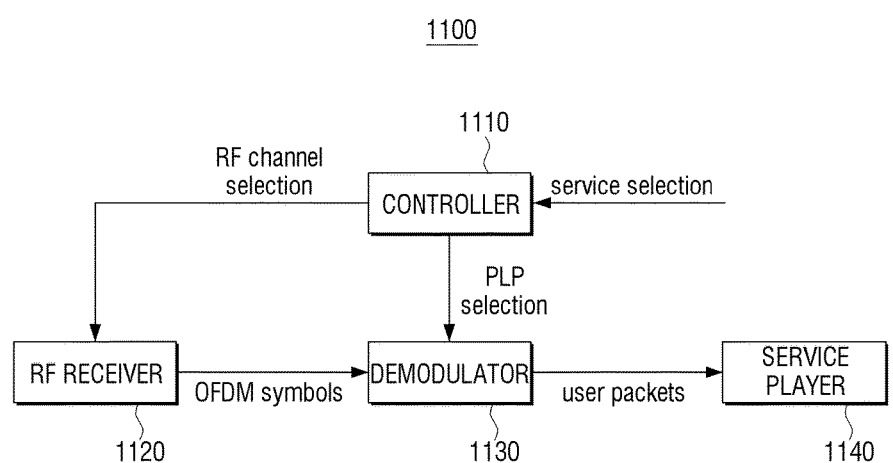
FIG. 11 is a block diagram illustrating a receiver according to an exemplary embodiment.

FIG. 11 is a block diagram illustrating the configuration of a receiver according to an exemplary embodiment.

Referring to FIG. 11, the receiver (1100) may be configured including a controller 1110, an RF receiver 1120, a demodulator 1130, and a service player 1140. The controller 1110 determines the RF channel and PLP through which the selected service is transmitted. In this case, the RF channel may be limited to center frequency and bandwidth, and PLP may be limited to PLP ID. A specific service may be transmitted through at least one PLP which belongs to at least one RF channel by components which consist of the specific service, but hereinbelow it will be assumed that all the data required to play one service are transmitted to one PLP which is transmitted via one RF channel, for convenience of explanations. That is, a service has an exclusive path to obtain data, and the obtained data path is limited to RF channel and PLP.

The RF receiver 1120 detects an RF signal from the RF channel selected by the controller 1110, and transmits to the demodulator 1130 OFDM symbols which are extracted by performing signal processing for the RF signal. Signal processing may include synchronization, channel estimation, equalization, or the like, and information for signal processing may be a pre-agreed value by the transmitter/receiver according to use and implementation, or may be included in specific OFDM symbol which is pre-agreed from among OFDM symbols, and is transmitted from the receiver.

The demodulator 1130 extracts a user packet by performing signal processing for OFDM symbols and transmits the user packet to the service player 1140, and the service player 1140 plays and outputs the service selected by a user by using the user packet. In this case, format of the user packet may be different according to a method for implementing a service. For example, there is a TS packet or IPv4 packet.

Figure 12:
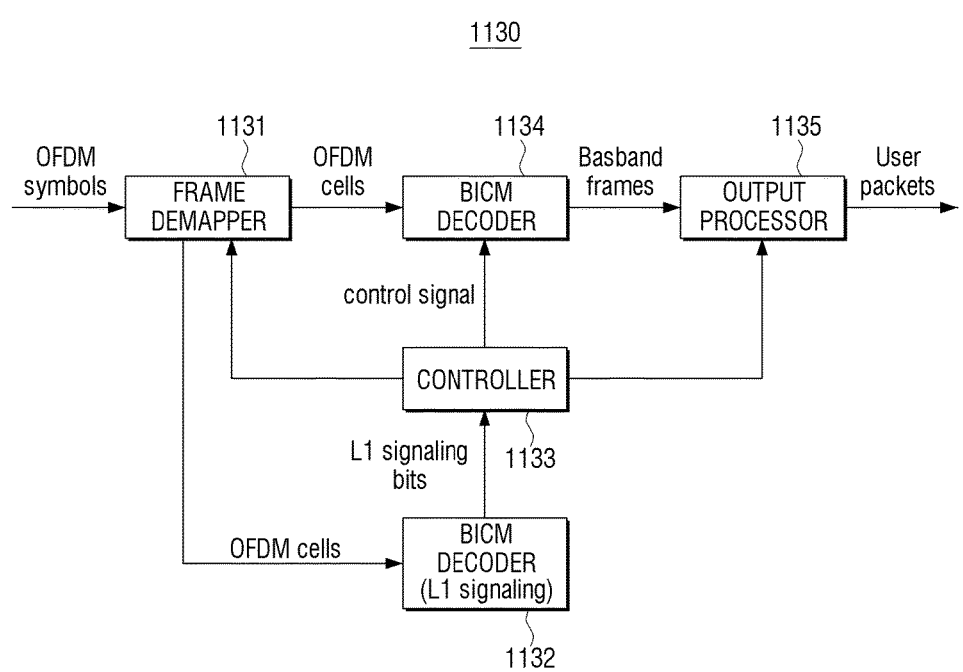
FIG. 12 is a block diagram illustrating a demodulator according to an exemplary embodiment.

FIG. 12 is a block diagram further illustrating the demodulator 1130 of FIG. 11 according to an exemplary embodiment.

Referring to FIG. 12, the demodulator 1130 may be configured including a frame demapper 1131, a BICM decoder 1132 for L1 signaling, a controller 1333, a BICM decoder 1334, and an output processor 1135.

The frame demapper 1131, based on control information transmitted from the controller 1133, selects ODFM cells which constitute FEC blocks belonging to PLP selected at a frame which constitutes of OFDM symbols, transmits the cells to the BICM demodulator 1134, selects OFDM cells which correspond to at least one FEC block including L1 signaling, and transmits the cells to the BICM decoder 1132 for L1 signaling. The BICM decoder 1132 for L1 signaling extracts L1 signaling bits by performing signal processing for OFDM cells which correspond to FEC block including L1 signaling, and transmit L1 signaling bits to the controller 1133. In this case, signal processing may include a process of extracting LLR (long-likelihood ratio) value for LDPC decoding at OFDM cells and a process of decoding LDPC signals by using the extracted LLR value.

The controller 1133 controls operations of the frame demapper 1131, the BICM decoder 1134, and output processor 1135 by extracting L1 signaling table from L1 signaling bits and using L1 signaling table value. FIG. 12 illustrates, for easier explanation, that the BICM decoder 1132 for L1 signaling does not use control information of the controller 1133. However, when L1 signaling has the hierarchy structure similar to the aforementioned L1-PRE and L1-POST structures, it is apparent that the BICM decoder 1132 for L1 signaling may constitute of at least one BICM decoding blocks, and the operations of the BICM decoding blocks and the frame demapper 1131 may be controlled by the upper level L1 signaling information.

The BICM decoder 1134 extracts baseband frames by performing signal processing for OFDM cells which constitute FEC blocks belonging to the selected PLP, and transmits the baseband frames to the output processor 1135. Herein, the signal processing may include the process of extracting LLR for decoding LDPC signal at OFDM cell and the process of decoding LDPC code by using the extracted LLR value, and these processes may be performed based on control information transmitted from the controller 1133.

The output processor 1135 extracts a user packet by performing signal processing for baseband frames and transmits the extracted user packet to the service player 1140. The signal processing may be performed based on control information transmitted by the controller 1133.

According to an exemplary embodiment, L1 signaling may include ISSY mode information, information on buffer size of the receiver according to ISSY mode information, and information on output time of the first user packet of the corresponding PLP included in the frame. In this case, information is included in control information transmitted by the controller 1133 to the output processor 1135. The output processor 1135 stores a user packet in a buffer based on control information and transmits the user packet to the service player in a predetermined time.

FIG. 13 is a flow chart which briefly illustrates the operations of the receiver from the time when a user selects a service to the time when the actually selected service is played.

It is assumed that service information on all the services selectable at the stage of initial scanning (S1300) is obtained before selecting a service by a user (S1310). The service information may include information on the RF channel and PLP from which data is delivered to play a specific service in the present broadcasting system. PSI/SI (Program-Specific Information/Service Information) of MPEG2-TS is an example of service information, which is generally obtainable from L2 signaling and signaling of an upper level.

When a user selects a service (S1310), the receiver changes the selected service (S1320) to frequency for transmitting the service, and performs detecting of the RF signal (S1330). In the process where changing (S1320) the selected service to the frequency for transmission, service information may be used.

When the RF signal is extracted, the receiver performs the operations of extracting signaling (S1340) from the detected RF signal. Then, the receiver selects the PLP (S1350) for transmitting the selected service using the extracted L1 signaling, and extracts the baseband frame (S1360) from the selected PLP. In the process of selecting (S1350) the PLP for transmitting the selected service, service information may be used. Further, the process of extracting (S1360) of the baseband frame may include the process of demapping the transmission frame and selecting the OFDM cells belonging to the PLP, the process of extracting LLR (log-likelihood ratio) for decoding of OFDM cells, and decoding LDPC code by using the extracted LLR value.

The receiver performs extracting the baseband packet from the baseband frame extracted using header information of the extracted baseband frame, and then, performs extracting the user packet (S1380) from the baseband packet extracted using the baseband packet.

In this case, the extracted user packet is used for playing the selected service (S1390). The L1 signaling information obtained in the step of extracting L1 signaling (S1340) during the process of extracting the baseband packet (S1370) and the process of extracting the user packet (S1380) may be used.

According to an exemplary embodiment, L1 signaling may include ISSY mode information, information on buffer size of a receiver which is required according to ISSY mode information, and information on output time of the first user packet of the corresponding PLP included in the frame, and in this case, information may be used for buffer control in the process of extracting the user packet (S1380). More specifically, L1 signaling may be used for control of size of buffer to store the extracted user packet and output time of the user packet to a service player.

In the above-described exemplary embodiments, it is assumed that the user packet is MPEG-2 TS packet, but the invention is not limited thereto. In addition, the user packet needs to be understood as a general term which indicates a formatted block of data, which includes IP packet.

As described above, according to various exemplary embodiments, during transmission of various types of service data, a transmission band may be efficiently used and an area occupied by signaling information may be minimized, thereby enhancing a frame structure.

An exemplary embodiment provides a non-transitory computer readable medium for storing a program for sequentially performing operations included in the signal processing method.

The non-transitory computer readable medium is a medium that semi-permanently stores data and from which data is readable by a device, but not a medium that stores data for a short time, such as register, a cache, a memory, and the like. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

Components, elements or units represented by a block in the block diagrams as illustrated in FIGS. 1-3, 6-8, 11 and 12 may be embodied as the various numbers of hardware, software and/or firmware structures that execute respective functions described above, according to exemplary embodiments. For example, these components, elements or units may use a direct circuit structure, such as a memory, processing, logic, a look-up table, etc. that may execute the respective functions through controls of one or more microprocessors or other control apparatuses. These components, elements or units may be specifically embodied by a module, a program, or a part of code, which contains one or more executable instructions for performing specified logic functions. Also, at least one of the above components, elements or units may further include a processor such as a central processing unit (CPU) that performs the respective functions, a microprocessor, or the like.

Although a bus is not shown in the aforementioned block diagrams for a transmitting apparatus and a receiving apparatus, communication between components may be performed in the transmitting apparatus and the receiving apparatus. In addition, each apparatus may further include a processor such as a central processing unit (CPU), a micro processor, etc. for performing the aforementioned various operations.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A transmitting apparatus comprising:
at least one processor configured to implement:
generating a super frame comprising a frame cluster;
inserting signaling information into the super frame; and
transmitting the super frame comprising the signaling information,
wherein the frame cluster comprises a plurality of frames,
wherein data types of at least two frames among the plurality of frames are identical to each other,
wherein the data types of the at least two frames are different from data types of remaining frames,
wherein the at least two frames comprise a first frame and a second frame,
wherein the signaling information comprises information on a time difference between a first symbol of the first frame and a first symbol of a third frame among the remaining frames, and
wherein if a type of service data required by a receiving apparatus is not included in the first frame, the information on the time difference is used for skipping the second frame in the receiving apparatus.

2. The transmitting apparatus as claimed in claim 1, the super frame further comprising future extension frame (FEF) parts
wherein the signaling information further comprises information about a number of frame clusters in the super frame and duration information about each of the FEF parts.

3. The transmitting apparatus as claimed in claim 1, wherein the plurality of frames comprise at least two of a mobile type frame, a fixed type frame, and a multiple input multiple output (MIMO) type frame, respectively.

4. The transmitting apparatus as claimed in claim 1, wherein the signaling information is inserted into a signaling area of the super frame, the signaling area being an area for transmission of L1 signaling.

5. A receiving apparatus comprising:
a receiver configured to receive a stream comprising a super frame, the super frame comprising a frame cluster and signaling information;
a signaling processor configured to obtain the signaling information from the stream; and
a processor configured to process the super frame based on the signaling information,
wherein the frame cluster comprises a plurality of frames,
wherein data types of at least two frames among the plurality of frames are identical to each other,
wherein the data types of the at least two frames are different from data types of remaining frames, wherein the at least two frames comprise a first frame and a second frame, wherein the signaling information comprises information on a time difference between a first symbol of the first frame and a first symbol of a third frame among the remaining frames, and wherein if a type of service data required by receiving apparatus is not included in the first frame, the processor skips the second frame based on the information on the time difference.

6. The receiving apparatus as claimed in claim 5, wherein the plurality of frames comprise at least two frames which are at least two of a mobile type frame, a fixed type frame, and a multiple input multiple output (MIMO) type frame, respectively.

7. The receiving apparatus as claimed in claim 5, wherein if the first frame comprises a type of service data required by receiving apparatus, information on a time difference between the first symbol of the first frame and a first symbol of the second frame is used for obtaining the second frame in the receiving apparatus.

8. A signal processing method of a transmitting apparatus, the signal processing method comprising:

generate a super frame comprising a frame cluster;

inserting signaling information into the super frame; and transmitting the super frame comprising the signaling information, wherein the frame cluster comprises a plurality of frames, wherein data types of at least two frames among the plurality of frames are identical to each other, wherein the data types of the at least two frames are different from data types of remaining frames, wherein the at least two frames comprise a first frame and a second frame, wherein the signaling information comprises information on a time difference between a first symbol of the first frame and a first symbol of a third frame among the remaining frames, and wherein if a type of service data required by a receiving apparatus is not included in the first frame, the information on the time difference is used for skipping the second frame in the receiving apparatus.

9. The signal processing method as claimed in claim 8, wherein the signaling information further comprises information about a number of frame clusters in the super frame and duration information about future extension frame (FEF) parts in the super frame.

10. The signal processing method as claimed in claim 8, wherein the plurality of frames comprise at least two of a mobile type frame, a fixed type frame, and a multiple input multiple output (MIMO) type frame, respectively.

11. A signal processing method of a receiving apparatus, the signal processing method comprising:

receiving a stream comprising a super frame, the super frame comprising a frame cluster and signaling information;

obtaining the signaling information from the stream; and processing the super frame based on the signaling information, wherein the frame cluster comprises a plurality of frames, wherein data types of at least two frames among the plurality of frames are identical to each other, wherein the data types of the at least two frames are different from data types of remaining frames, wherein the at least two frames comprise a first frame and a second frame, wherein the signaling information comprises information on a time difference between a first symbol of the first frame and a first symbol of a third frame among the remaining frames, and wherein if a type of service data required by receiving apparatus is not included in the first frame, the method comprises skipping the second frame based on the information on the time difference.

12. The signal processing method as claimed in claim 11, comprises a type of service data required by receiving apparatus, information on a time difference between the first symbol of the first frame and a first symbol of the second frame is used for obtaining the second frame in the receiving apparatus.

* * * * *